No. 890,736. PATENTED JUNE 16, 1908.
M. WAGNER.
JOURNAL BEARING LINER.
APPLICATION FILED OCT. 12, 1906.
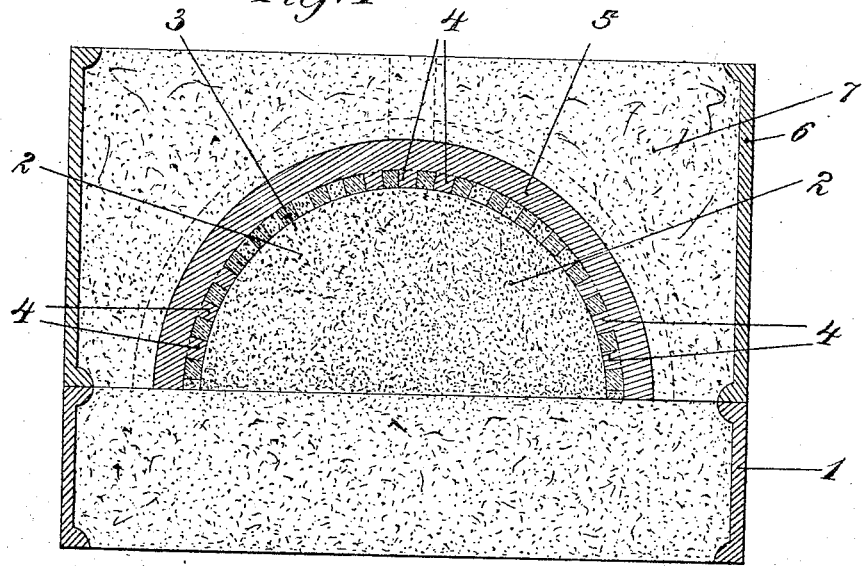
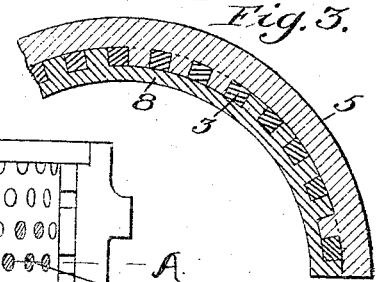
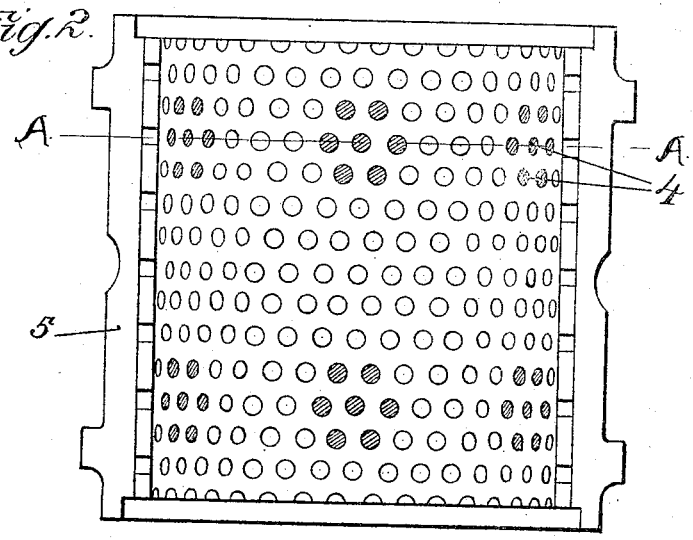
Witnesses
Inventor
Max Wagner
By Briesen & Knauth
Attorneys

UNITED STATES PATENT OFFICE.

MAX WAGNER, OF WIESBADEN, GERMANY.

JOURNAL-BEARING LINER.

No. 890,736.

Specification of Letters Patent.

Patented June 16, 1908.

Application filed October 12, 1906. Serial No. 338,545.

*To all whom it may concern:*

Be it known that I, MAX WAGNER, manufacturer, and resident of 9 Uhlandstrasse, Wiesbaden, in the Kingdom of Prussia, German Empire, have invented new and useful Improvements Relating to Journal-Bearing Liners and the Like, of which the following is a specification.

The present invention relates to liners for journal bearings, slide plates and the like wherein a resistant metal (such for instance as bronze, iron or steel) is employed to form a rigid skeleton around which the soft metal is cast in such a manner that the soft metal alone constitutes the bearing surface for the journal or the like. In these bearings, according to one construction, the skeleton may be combined or connected with a rigid outer bearing block or liner formed, for instance, of cast iron. This has been effected hitherto by riveting or screwing together the skeleton and liner, a method which has the disadvantage of producing in the outer cast iron block a partial weakening, due, 1st, to the holes for the rivets or screws and the countersinking of said holes; and 2nd, to the longitudinal grooves which are required for the purpose of relieving the screws of strain in the case of bearing blocks carrying a heavy load. This method of connection has the further disadvantage that the drilling and countersinking of the holes, as also the cutting of the screw threads etc. necessitates the employment of special machines. Moreover, in those cases in which a perforated metal plate has been used as the stiffening skeleton and has been designed to project beyond the soft metal at the bottom of the bearing in order to serve as a support for the latter, in the outer bearing block, it was desirable that the skeleton plate should fit as closely as possible against the inner wall of the cast iron bearing block, so that, when the soft metal was poured in, none of this metal should find its way underneath the perforated plate. In order to achieve this end, it was in most cases necessary to bore out or plane out the cast iron bearing block, which entailed of course an increase in the cost of manufacture.

The present invention consists in effecting the connection of the skeleton with the outer cast iron liner or bearing block by casting the parts together, instead of by riveting or screwing them together.

The advantages which are attained by the new method of connection are very considerable. First, the holes for the rivets or screws, which weakened the material of the cast iron bearing block, are dispensed with, while the more intimate union between the bearing block and the skeleton allows of the use of a bearing block having a less thickness of wall in proportion to a given load on the bearing. Further, all tooling and finishing of the inner surface of the bearing block, such as was necessary in many cases where the connection was made by means of screws or rivets, is dispensed with.

With the new method of connection, the skeleton serves to strengthen not only the soft metal, but also the body of the outer bearing block. Consequently the journal may be made of greater diameter relatively to a given outside dimension of the bearing block. In many cases cast iron may be used for the outer bearing block, in place of the relatively dearer cast steel.

The connection is preferably effected by placing the skeleton in the mold, after having first stopped up the greater number of the holes in the plate (which is composed of wrought iron) with molders' sand or by any other suitable means. Then, after the mold has been fastened together, the casting metal is poured in and penetrates into those holes which have not been stopped up, with the result that an intimate connection takes place between the cast iron bearing block and the inserted skeleton.

Instead of leaving some of the holes in the skeleton free to allow of the passage of the cast metal through them, all the holes may be filled with molders' sand to a predetermined height, so that the cast metal may penetrate into all the holes.

The casting produced in this manner may, after having been cleaned, have the soft bearing metal cast directly on to it.

Instead of cast iron other metals such as cast steel, bronze or the like may be used in the same manner for the outer bearing block.

The accompanying drawing illustrates the method of manufacturing one of the improved bearing blocks, Fig. 1 showing the bearing during the casting operation in the mold, in section on line A—A of Fig. 2, while Fig. 2 is a plan view of the bearing after the skeleton has been secured by casting, and Fig. 3 is a cross section of the finished bearing lined with soft bearing metal.

1 is the underflask of the mold; 2 is the core upon which is laid the perforated wrought iron plate 3 forming the skeleton above referred to. The holes in this plate are filled up with molders' sand with the exception of a certain number of holes 4 which are left vacant so that the poured metal used for the casting of the bearing block or liner 5 may enter said holes.

6 is the upper flask of the mold, which is filled with molders' sand 7 in the usual manner.

The pattern for the outer bearing is rammed in and then removed before the casting of the block 5. As indicated in the drawing, those portions of the cast metal which have entered the holes 4 will, in the finished bearing, hold the skeleton 3 as it were by means of rivets firmly to the outer bearing block 5. The soft bearing metal is then cast on to the concave side of the skeleton in any approved manner, and this soft metal 8 will, as shown in Fig. 3, run into the perforations of the skeleton 3 as far as they have not been filled by the projections formed in casting the liner or supporting element 5.

The use of skeletons as described, connected to an outer member by casting on to the same, is capable of use in all kinds of bearings, slide plates and built-in parts.

Now what I claim and desire to secure by Letters Patent is the following:

1. A machine element comprising a supporting element with integral projections extending from one of its faces, a perforated skeleton in engagement with said face, said projections filling the perforations of the skeleton in part, and a soft metal layer covering the side of the skeleton opposite to that on which the supporting element is located, said layer of soft metal having integral projections extending toward the supporting element and into the perforations of the skeleton so far as they are not filled by the projections of the supporting element.

2. A machine element comprising a supporting element with integral projections extending from one of its faces, a perforated skeleton in engagement with said face, said projections filling the perforations of the skeleton in part, and a soft metal layer covering the side of the skeleton opposite to that on which the supporting element is located, said layer of soft metal having integral projections extending toward the supporting element and into part of the perforations of the skeleton.

3. A machine element comprising a layer of soft metal having a continuous exposed surface adapted for engagement with the moving part, a supporting element having integral projections extending toward said layer of soft metal, and a perforated skeleton embedded between the said layer of soft metal and the supporting element, the perforations of said skeleton being filled partly by the projections of the supporting element and partly by the soft metal.

In testimony, that I claim the foregoing as my invention, I have signed my name in presence of two witnesses, this twenty ninth day of September 1906.

MAX WAGNER.

Witnesses:
RICHARD LEONHARD,
MORITZ LUDWIG GAEBLER